United States Patent [19]

Olschewski

[11] Patent Number: 4,682,972
[45] Date of Patent: Jul. 28, 1987

[54] COVER PLATE FOR UNIVERSAL JOINT ASSEMBLY

[75] Inventor: Armin Olschewski, Schweinfurt, Fed. Rep. of Germany

[73] Assignee: SKF GmbH, Schweinfurt, Schweinfurt, Fed. Rep. of Germany

[21] Appl. No.: 808,821

[22] Filed: Dec. 13, 1985

[30] Foreign Application Priority Data

Dec. 22, 1984 [DE] Fed. Rep. of Germany ....... 3447275

[51] Int. Cl.$^4$ ............................ F16D 3/26; F16D 3/40
[52] U.S. Cl. ...................................................... 464/130
[58] Field of Search ............... 464/128, 130, 132, 134, 464/135

[56] References Cited

U.S. PATENT DOCUMENTS

| 1,853,300 | 4/1932 | Cutting | 464/130 |
| 2,253,300 | 8/1941 | Karlberg | 464/130 |
| 2,273,920 | 2/1942 | Anderson | 464/130 |
| 2,299,001 | 10/1942 | Anderson | 464/130 |
| 3,421,342 | 1/1969 | Rossiter | 464/130 |
| 3,783,638 | 1/1974 | Doran et al. | 464/130 |
| 3,937,035 | 2/1976 | Fisher et al. | 464/130 |
| 4,103,512 | 8/1978 | McElwain et al. | 464/130 X |

FOREIGN PATENT DOCUMENTS 789480 1/1958 United Kingdom ............... 464/130

Primary Examiner—Daniel P. Stodola
Attorney, Agent, or Firm—Eugene E. Renz, Jr.

[57] ABSTRACT

In a universal joint assembly consisting of a cross piece having at least one pin supported in a bearing bushing, the bearing bushing having a bottom section and an adjacent sleeve section; at least one fork arm having a recess extending in the direction of the pin machined to hold the sleeve section; a cover plate attached removably to the fork arm which holds the sleeve section transversely in place in the recess; a support acting on the bottom section in the longitudinal direction from the outside toward the inside, in the form of a strap integral with the cover plate, and attached to an outer end surface of the fork arm by screw fasteners or the like.

1 Claim, 4 Drawing Figures

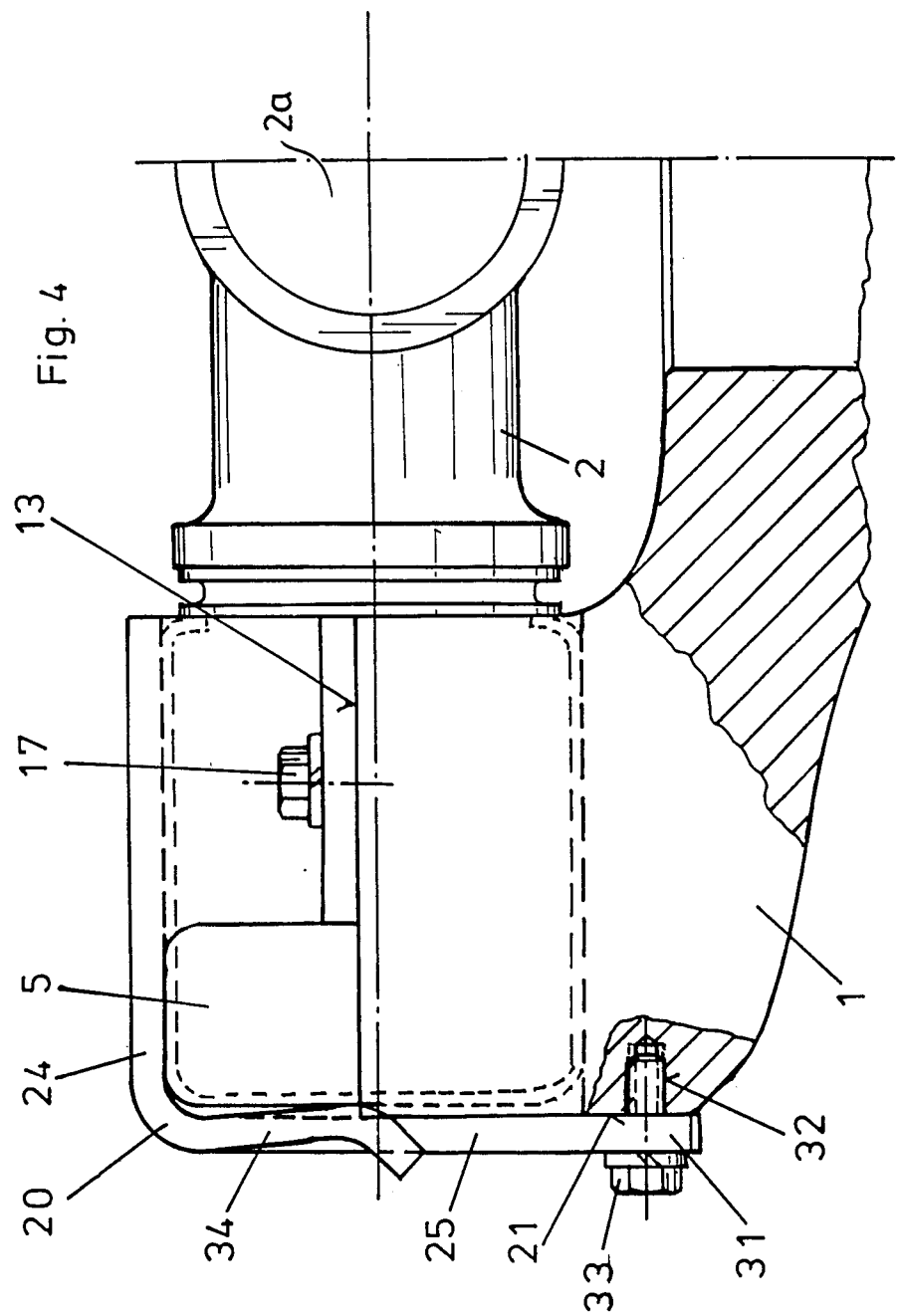

COVER PLATE FOR UNIVERSAL JOINT ASSEMBLY

FIELD OF THE INVENTION

The present invention relates to universal joints and more specifically to new and improved means for securing the bearing bushing of universal joints in its associated fork eye.

BACKGROUND OF THE INVENTION

West German Pat. No. 874,561 shows support means for a universal joint which acts axially from the outside on the bottom section of each bearing bushing which is in the form of a leaf spring inserted in a ring-shaped groove in the eye of the fork. This arrangement has certain disadvantages and drawbacks. For example, it has been found that during application of sudden axial loads which occur during operation, the hard, thin-walled leaf springs dig into or penetrate the ring-shaped groove of the relatively soft fork eye material and thus tend to loosen. Thus, the reliable securing of each bearing bushing axially in its associated fork eye can no longer be guaranteed. Furthermore, it is noted that production of this type of known universal joints is expensive by reason of the fact that it is necessary to form a ring-shaped groove into each fork eye for holding the leaf spring. This groove must be machined in a precision manner both as to position and shape. Additionally, the assembly of these known-type universal joints is relatively complicated by reason of the fact that the universal joint needs to be attached by screws to the associated fork arm in such a way that the ring-shaped groove section in the recess of the fork eye is in precise alignment with the ring-shaped groove section of the cover plate.

SUMMARY OF THE INVENTION

With the foregoing in mind, it is an object of the present invention to provide a new and improved means for supporting the bearing bushing in the fork eye which is characterized by novel features of construction and arrangement which firmly and securely seats and supports the same against becoming loose and which is also economical to produce and assemble. Universal joint assemblies typically comprise a cross piece with pins supported in each case in a bearing bushing having a bottom section and an adjacent sleeve section. A recess extending in the direction of the pin is machined in each fork arm to hold the sleeve section. The assembly further includes a cover plate removably attached to the fork arm which holds the sleeve section transversely in place in the recess and support means acting on the bottom section in the longitudinal direction from the outside toward the inside. In accordance with the present invention, a strap holds the bearing bushing from the outside. This strap can be economically produced together with the cover plate. Consequently, there are only a few structural components which means that the assembly of the universal joint according to the invention is relatively simple. It has been observed that even under severe operating conditions which produce sudden axial loads from the journal against the bottom section of the bearing bushing, the bushing remains firmly supported in the eye of the fork and there is no tendency to become loose.

In accordance with another feature of the present invention, the strap of the cover plate is preferably thin-walled and is located on the bottom section of the bearing bushing to press against it elastically. Thus, the bearing bushing is pressed elastically inwardly in the direction of the axis of the associated pin and consequently, any sudden axial loads during operation are elastically absorbed by the elastically resilient strap. It has been found that even in the case of contact wear during operation between the end surface of the pin and the bottom section or the thrust washer of the bearing bushing attached to the bottom section, the bearing bushing remains located against the end surface of the pin without play notwithstanding longitudinally sliding movement in the fork eye.

In accordance with a still further feature of the present invention, the strap has a lengthwise connecting section secured to the outer end of the cover plate and an adjacent mounting section angled toward the fork arm attached to the outer end surface thereof. By this arrangement the connecting section of the strap radially encompasses the end of the sleeve section adjacent the bottom end. This connecting section can thus be designed to be elastic so that it presses the bearing bushing into the recess of the associated fork arm without play. The bearing bushing of the present invention also includes at least one leaf spring section which presses elastically inwardly against the bottom section of the bearing bushing in the longitudinal direction formed on the strap member. As a result of this arrangement, the bearing bushing is adjusted inwardly and supported in the direction of the axis of the associated pin by the leaf springs of the cover plate which may be specially hardened to increase their flexural elasticity.

BRIEF DESCRIPTION OF THE DRAWINGS

These and other objects of the present invention and the various details of the operation and construction thereof are hereinafter more fully set forth with reference to the accompanying drawings, wherein:

FIG. 4 is a longitudinal side elevational view as viewed in the direction of the arrow B in FIG. 3 of the journal bearing illustrated therein.

DESCRIPTION OF THE PREFERRED EMBODIMENTS

Figure 1:
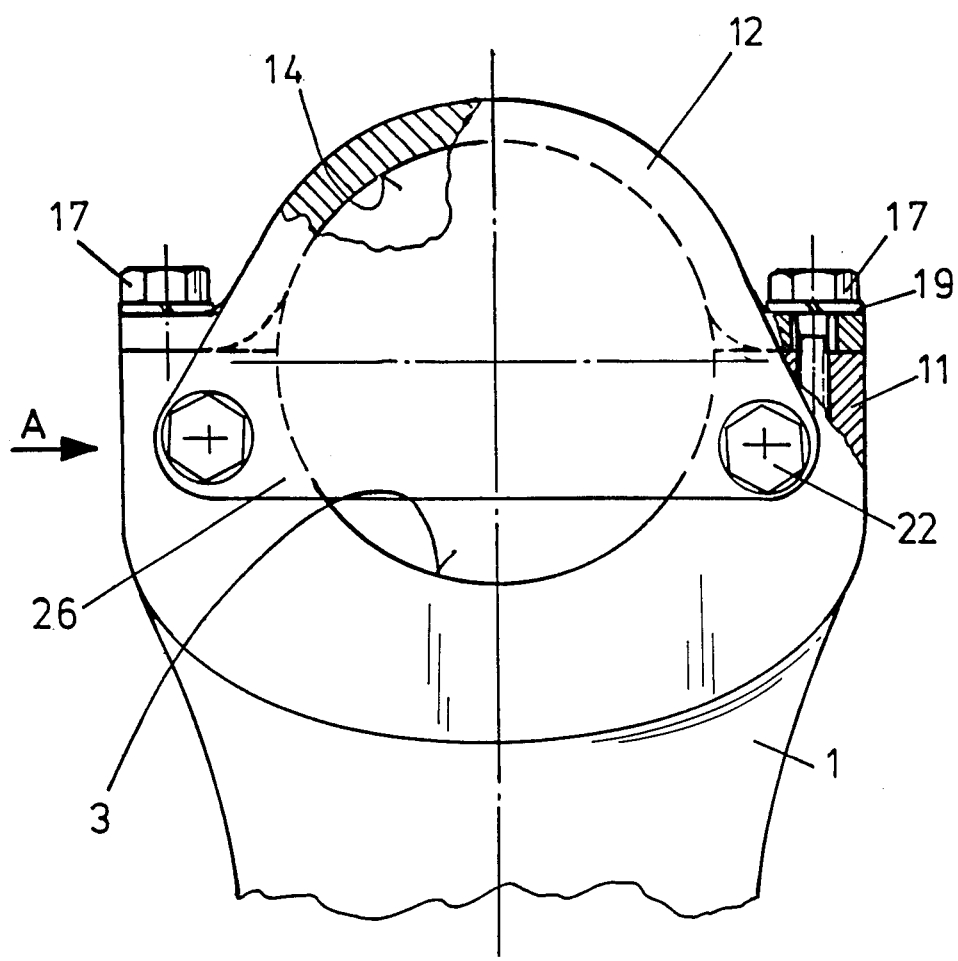
FIG. 1 is an end elevational view partly in section of a journal bearing of a universal joint assembly constructed in accordance with the present invention.
Figure 2:
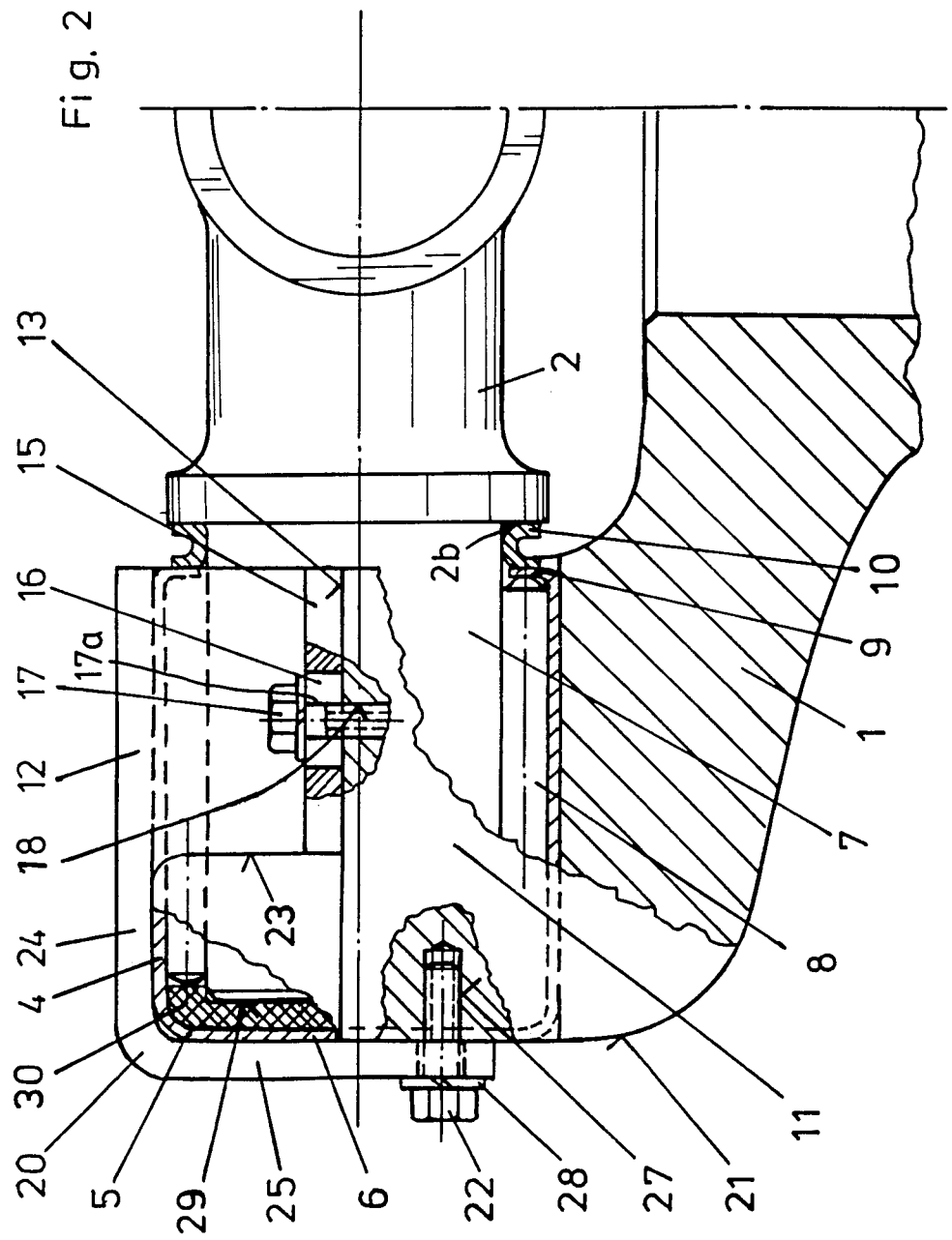
FIG. 2 is a side elevational view partly in section as viewed in the direction of the arrow A of FIG. 1 showing the journal bearing.

Referring now to the drawings and particularly to FIGS. 1 and 2 thereof, there is illustrated one of a pair of fork arms of a joint fork of a universal joint assembly generally designated by the numeral 1. The joint fork cooperates in a known manner through a cross piece 2 with a second joint fork (not shown).

As shown in FIGS. 1 and 2, a longitudinal recess 3 is provided in each fork arm 1 which extends from the end surface thereof, the recess 3 in the illustrated embodiment being designed with a semi-circular cross section. The cylindrical sleeve section 4 of a bearing bushing 5 is seated in the recess 3. Bearing bushing 5 includes a bottom section 6 adjoining the sleeve section 4 and may be produced from sheet steel by a deep drawing operation and hardened at least in the bore of the sleeve section 4. The cross piece 2 of the universal joint assembly has four cylindrical pins which project radially from a hub section (only one is shown). Each pin 7 is supported in the bore of sleeve section 4 on cylindrical rolling elements 8 so that it is free to rotate. The inner circumferential edge of the open end of the bearing bushing 4 is formed with a radially inwardly directed shoulder section 9 to guide the rolling elements 8 laterally. A rubber sealing element 10 of U-shaped cross section is mounted between the shoulder 9 and an enlarged abutment surface 2b of the cross piece 2. As illustrated in FIG. 1, the fork arm 1 is formed with an edge section 11 having a flat support surface 13 on opposite sides of the recess 3 which supports a cover plate 12. Support surfaces 13 of the edge sections 11 lie in a common plane adjacent the center line of the pin 7.

Cover plate 12 may be made from strip steel, for example, by a stamping and pressing operation without cutting and as illustrated, has an arcuate interior surface area 14 which tightly embraces the cylindrical, lateral surface of sleeve section 4 of the bearing bushing so that a fork eye is formed between recess 3, the fork arm 1 and the arcuate surface area 14. Cover plate 12 is formed with transverse side flange sections 15 which mate and confront the support surfaces 13 of fork arm 1. An enlarged opening 16 is provided in each flange section 15 so that the flange section 15 may be firmly clamped by a screw member 17 to the opposite support surface 14 of fork arm 1 and is thus held with friction on this support surface in a removable manner. The screw 17, as illustrated, passes through screw hole 16 and engages in threaded openings in the support surface. Screws 17 are locked in place by means of a split lock washer 19.

Support means is provided which acts from the outside toward the inside on the bottom section 6 of the bearing bushing in the longitudinal direction. In the present instance, the support means comprises a strap 20 connected integrally to the cover plate 12 which is attached to the outer end surface 21 of fork arm 1 by a pair of screw fasteners 22. The strap 20 is preferably designed with relatively thin walls and is arranged to press with flexural elasticity against the bottom 6 of the bearing bushing 5. Strap 20 has a longitudinally oriented connecting section 24 which smoothly joins so that it presses with tension on the lateral surface of the sleeve section 4 of the bearing bushing 5. Connecting section 24 includes a mounting section 25 angled toward fork arm 1. The mounting section 25 includes on each transverse side a terminal section 26 which extends beyond the recess 3 of the fork arm 1. Terminal section 26 is firmly supported on end surface 21 by means of screws 22 which tap into threaded bores 27 in the outer end surface 21 of fork arm 1. A split lock washer 28 locks each screw 22 in place to secure the assembly. By the arrangement, when the bottom wall 6 of the bearing bushing 5 is pressed against mounting section 25, strap 20 can yield somewhat since its mounting section 25 bends elastically outwardly between the mounting screws 22. Compressive loads such as this occur during operation when end surface 29 of pin 7 strikes thrust washer 30 inside bearing bushing 5. At the same time, bearing bushing 5 slides and shifts slightly in the longitudinal direction in the eye of the fork.

Considering now the assembly procedure for assembling a universal joint in accordance with the present invention, first the bearing bushings 5 complete with rolling elements 8 are pushed onto pins 7 of cross piece 2. Then the bearing bushings 5 of two opposed aligned pins 7 of the cross piece 2 are inserted in each case into a recess 3 of the two joint forks. Thereafter a cover plate 12 is placed on each of the bearing bushings 5. Thereafter the two terminal sections 26 of each cover plate 12 are attached by means of screws 22 to end surface 21 of fork arm 1. Force is exerted from the outside against the mounting section 25 in such a way that the strap 20 bends and engages bottom section 6 of bearing bushing 5 with pretension. While this contact is maintained, screws 17 are inserted through screw hole 17a and secured into tapped bores 18 until flange section 15 firmly abuts against support surface 13 of fork arm 1. Lastly, the pressure is released so that the strap 20 by virtue of its intrinsic elasticity presses permanently against bottom section 6 of bearing bushing 1. Bearing bushings are installed into the section joint fork (not shown) of the universal joint assembly in a manner similar to that described above.

Figure 3:
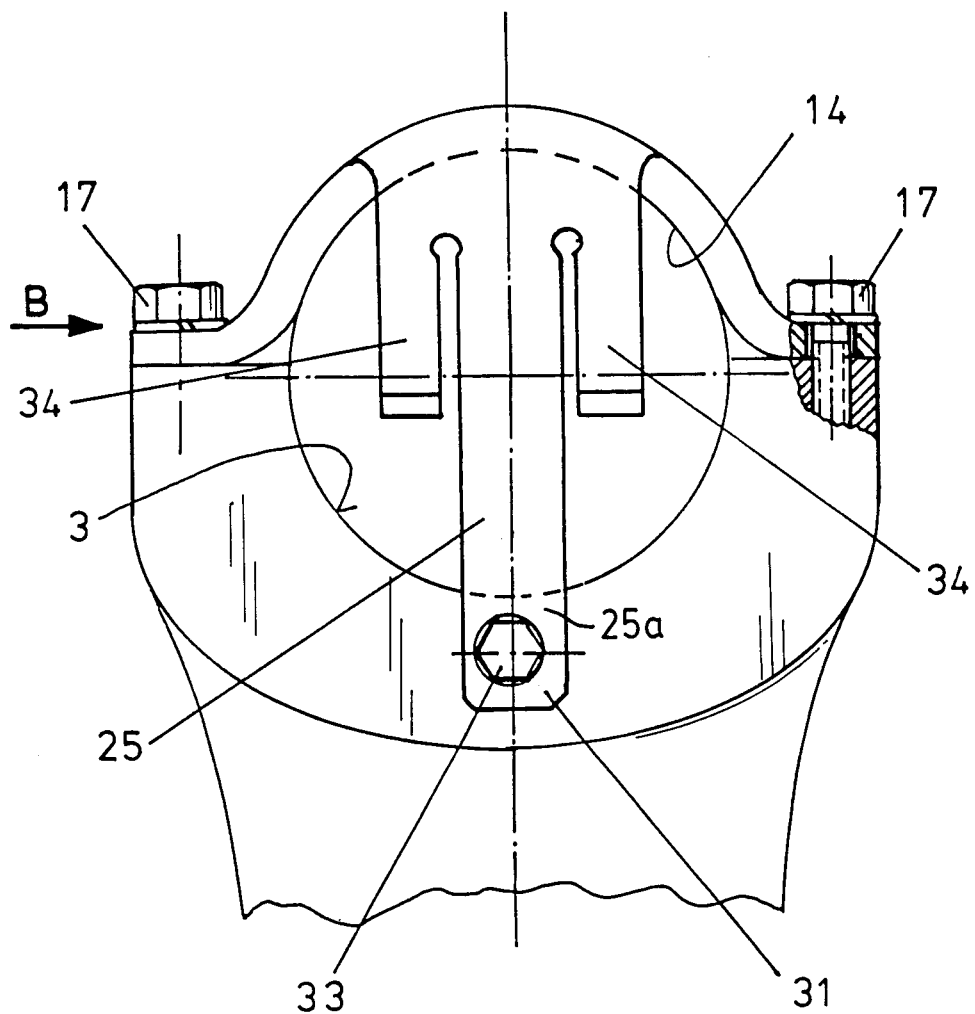
FIG. 3 is an end elevational view of the journal bearing of a modified embodiment of a universal joint in accordance with the present invention.

There is illustrated in FIGS. 3 and 4 a fork arm 1 of a modified universal joint assembly. Bearing bushing 5 and associated cross piece 2 are designed in the same way as in the previously described embodiment. Thus strap 20 of cover plate 12 has a longitudinal connecting section 24 joining with the outer end of the cover plate 12 and a mounting section 25 angled toward fork arm 1 and attached to the outer end surface 21 of fork arm 1.

In the present instance, however, mounting section 25 of strap 20 has only a single terminal section 25a which extends across and beyond the base of recess 3 of fork arm 1. This terminal section is permanently connected to fork arm 1 by means of a screw 33 which is screwed into a threaded hole 32 in the outer end surface 21 of fork arm 1.

A hardened leaf spring section is provided on both transverse sides of the relatively narrow mounting section 25 which presses inwardly in a flexurally elastic manner against bottom section 6 of the bearing bushing 5. The leaf spring sections 34 as illustrated project longitudinally toward the inside with respect to the mounting section 25 of strap 20 to engage the bottom section 6 of the bearing bushing and press the bearing bushing against rubber sealing ring 10. By reason of this construction, the bearing bushing is held permanently inward under pretension in the longitudinal direction by the leaf spring sections 34. Accordingly, when pin 7 is exerting relatively high compressive loads which act in a longitudinal direction toward the outside on the bearing bushing 5, the bearing bushing 5 shifts in the eye of the fork and the two leaf spring sections 34 bend outward to such an extent to cause bottom section 6 to rest against the much more rigid mounting section 25. By this arrangement, the shifting movement of the bearing bushing in the eye of the fork is limited toward the outside and damped by the action of the leaf springs.

The universal joint assembly described above in connection with FIGS. 3 and 4 is assembled in the same manner as the embodiment of FIGS. 1 and 2 previously described.

While particular embodiments of the present invention have been illustrated and described herein, it is not intended to limit the invention and changes and modifications may be made therein within the scope of the following claims. For example, the strap 20 may be provided with terminal sections which extend both over the two transverse sides and over the base of the recess of the fork arm. By this arrangement, the mounting section 25 of the strap 20 is then in the shape of a cross wherein one of the four ends of the cross is connected integrally with the connecting section 24 of the strap 20. Each of the three other arms of the cross has a terminal section which can be attached by screw fasteners to the end surface of the fork arm. Further, the bearing bushing does not necessarily have to be designed as a roller bearing bushing. For example, it can also be constructed as a journal bearing bushing which slides on an associated journal of the cross piece and can be produced from a load friction plastic material.

SUMMARY

A universal joint consists of a cross piece (2) with pins (7), which are supported in each case in a bearing bushing (5) with a bottom section (6) and a sleeve section (4) joined to it, and two joint forks, each with two fork arms (1). In each fork arm (1) there is a longitudinal recess (3). The sleeve section (4) is held rigidly in recess (3) by a cover plate (12), which is removably attached to the fork arm (1). On the cover plate (12) there is a support, which acts from the outside on the bottom section (6) of bearing bushing (5) in the longitudinal direction.

So that the universal joint can be supported by the support without the danger of coming loose, the support is formed by a strap (20), which is connected integrally with the cover plate (12), and which is attached by screws (22) or the like to an outer end surface (21) of the associated fork arm (1).

What is claimed is:

1. In a universal joint assembly consisting of a cross piece (2) having at least one pin (7) supported in a bearing bushing (5), the bearing bushing having a bottom section (6) and an adjacent adjacent sleeve section (4); a fork having a least one fork arm (1) extending therefrom and terminating in an edge section (11), the edge section having a recess (3) machined therein which receives the bearing bushing and support surfaces (13) disposed on opposite sides of the recess; a cover plate (12) removably attached to the fork arm to support and hold the bearing bushing in the recess, the cover plate comprising a strap (20) having flange sections (15) connected to the support surfaces by means of screw fasteners (17), an elongated mounting section (25) extending across the bottom section of the bearing bushing and having a terminal section (25a) connected to the fork arm by means of a screw fastener (33), and a pair of leaf spring sections (34) disposed on opposite sides of the mounting section and having a shorter length than the mounting section, the leaf spring sections press elastically inwardly against the bottom section of the bearing bushing with a predetermined pretension in the longitudinal direction.

* * * * *